US009249781B2

(12) United States Patent
Lang et al.

(10) Patent No.: US 9,249,781 B2
(45) Date of Patent: Feb. 2, 2016

(54) METHOD FOR ROBUST WIRELESS WIND TURBINE CONDITION MONITORING

(75) Inventors: Christoph Lang, Cupertino, CA (US); Peter Volkmer, Dresden (DE); Murat Senel, San Mateo, CA (US); Vivek Jain, Mountain View, CA (US); Lakshmi Venkatraman, Mountain View, CA (US); Huang Lee, Fremont, CA (US)

(73) Assignee: Robert Bosch GmbH, Stuttgart (DE)

( * ) Notice: Subject to any disclaimer, the term of this patent is extended or adjusted under 35 U.S.C. 154(b) by 1070 days.

(21) Appl. No.: 13/341,291

(22) Filed: Dec. 30, 2011

(65) Prior Publication Data

US 2013/0170981 A1 Jul. 4, 2013

(51) Int. Cl.
*F03D 7/04* (2006.01)

(52) U.S. Cl.
CPC ............... *F03D 7/047* (2013.01); *F03D 7/048* (2013.01); *F05B 2270/111* (2013.01); *F05B 2270/326* (2013.01); *Y02E 10/723* (2013.01)

(58) Field of Classification Search
CPC ....... F03D 7/047; F03D 11/0091; F03D 7/04; F03D 7/042; F03D 7/02
See application file for complete search history.

(56) References Cited

U.S. PATENT DOCUMENTS

| | | | |
|---|---|---|---|
| 2003/0094956 A1 | 5/2003 | Orenstein | |
| 2005/0023882 A1 | 2/2005 | Burger et al. | |
| 2006/0214800 A1 | 9/2006 | Ishikawa | |
| 2007/0031781 A1 | 2/2007 | Warner et al. | |
| 2007/0139181 A1 | 6/2007 | Eren et al. | |
| 2009/0122782 A1 | 5/2009 | Horn et al. | |
| 2009/0232635 A1* | 9/2009 | Menke | 415/17 |
| 2009/0318175 A1 | 12/2009 | Sandberg | |
| 2010/0021298 A1* | 1/2010 | Sandvad | 416/1 |
| 2010/0116365 A1 | 5/2010 | McCarty | |
| 2010/0253569 A1 | 10/2010 | Stiesdal | |

OTHER PUBLICATIONS

International Preliminary Report on Patentability corresponding to PCT Application No. PCT/US2012/071866, mailed Jul. 10, 2014 (6 pages).

* cited by examiner

*Primary Examiner* — Edward Look
*Assistant Examiner* — Christopher J Hargitt
(74) *Attorney, Agent, or Firm* — Maginot Moore & Beck LLP (57) ABSTRACT

A wind turbine condition monitoring system and method are disclosed where the wind turbines include a tower, a gearbox coupled to the tower, and turbine blades coupled to the gearbox. The monitoring system includes blade sensors coupled to the blades, a hub node coupled to the gearbox and a controller. The controller is in communication with the hub node and blade sensors, and determines blade positions based on blade sensor readings. The blade sensors and hub node can include multi-axis accelerometers. The controller can wirelessly communicate with the blade sensors directly or through the hub node. Using position information, shadowing areas with obstructed communication can be avoided, node separation can be accounted for to reduce power requirements and/or interference from multiple transmitters can be avoided during node communications.

21 Claims, 9 Drawing Sheets

METHOD FOR ROBUST WIRELESS WIND TURBINE CONDITION MONITORING

BACKGROUND

This patent relates to monitoring and communication systems and techniques, and more particularly to monitoring and communication systems and techniques for wind turbines.

Harvesting wind energy using wind turbines to supply electrical power is an increasing market. The efficiency and lifespan of wind turbines is dependent upon the conditions of the wind turbines, so there are many applications that use sensors mounted on wind turbine blades for condition monitoring. Wind turbine blade condition monitoring systems typically use wired communication between the sensors attached to wind blades and the controller which may or may not be located on the wind turbine. The controller detects the wind blade sensor readings, runs the required algorithms based on the needs of the specific applications, and then communicates the decision to a hub node of the wind turbine to take appropriate actions such as stopping the rotor, increasing/decreasing the blade rotation speed, etc. It is envisioned that communication between the sensors and the hub/controller can be wireless while the communication between the hub node and controller can be wired or wireless. However, the wireless communication paths between the various communication nodes of a wind turbine condition monitoring system can periodically be obstructed by structures of the wind turbine. For example, the tower may obstruct communication between a sensor on a turbine blade and a controller.

Condition monitoring of wind turbine blades can increase the lifetime of the blades and turbine by detecting abnormalities earlier and thereby enabling the taking of preventive actions earlier to avoid extensive damage to the blades and turbine. One of the various sensors that can be used for condition monitoring is an accelerometer sensor. Accelerometer sensors, when placed on an object, can be used to measure the vibration of that object. Accelerometers can also be used to determine the position of an object, for example the wind turbine blade positions.

It would be desirable to detect the positions of the wind turbine blades and use the position information to develop robust wireless communication schedules between blade sensors, hub nodes and controllers that meet desired communication parameters. These desired communication parameters can include for example, avoiding path obstruction and multiple transmission interference, and achieving reliability and power efficiency measures.

SUMMARY

A wind turbine condition monitoring system for one or more wind turbines is disclosed, where each of the wind turbines includes a tower, a gearbox coupled to the tower and a plurality of turbine blades coupled to the gearbox. The condition monitoring system includes a plurality of blade sensors, a hub node and a controller. The blade sensors provide blade sensor readings. Each of the plurality of blade sensors is coupled to one of the plurality of blades of the one or more wind turbines. The hub node is coupled to the gearbox of each of the one or more wind turbines. The controller is in communication with the one or more hub nodes and with the plurality of blade sensors. The controller determines the position of each turbine blade of the plurality of turbine blades based on the blade sensor readings. The blade sensors can include multi-axis accelerometers.

In a single level communication hierarchy embodiment, the controller can have direct wireless communication with the one or more hub nodes and with each of the plurality of blade sensors. The controller can be configured to only communicate with a particular blade sensor of the plurality of blade sensors when the particular blade sensor is outside blade shadowing areas. Direct wireless communication between the controller and the particular blade sensor being obstructed when the particular blade sensor is in the blade shadowing areas. The controller can be configured to only communicate with a particular hub node of the one or more hub nodes when the particular hub node is outside hub node shadowing areas. Direct wireless communication between the controller and the particular hub node being obstructed when the particular hub node is in the hub node shadowing areas.

In a two level communication hierarchy embodiment, the controller can have direct wireless communication with the one or more hub nodes, and for each particular wind turbine, the hub node of the particular wind turbine has direct wireless communication with each of the plurality of blade sensors coupled to the blades of the particular wind turbine. In this two level communication hierarchy embodiment, the controller receives the blade sensor readings from the plurality of blade sensors through the one or more hub nodes. For each particular wind turbine, the hub node can be configured to only communicate with a particular blade sensor of the wind turbine when the particular blade sensor is not in blade shadowing areas. Direct wireless communication between the hub node and the particular blade sensor being obstructed when the particular blade sensor is in the blade shadowing areas. The controller can be configured to only communicate with a hub node when that hub node is outside hub node shadowing areas. Direct wireless communication between the controller and a hub node being obstructed when the hub node is in the hub node shadowing areas.

The controller can be configured to only communicate with a particular blade sensor when the particular blade sensor is in a favorable communication region. The controller can determine whether a blade sensor is in the favorable communication region based on the blade sensor readings. The favorable communication region has an unobstructed communication path between the controller and the blade sensor. The favorable communication region can be further constrained such that the separation distance between the controller and the particular blade sensor is less than a separation threshold when the particular blade sensor is in the favorable communication region. The favorable communication region can also be further constrained such that only one blade sensor of the plurality of blade sensors is in the favorable communication region at a time.

A wind turbine condition monitoring method for wind turbines with a monitoring system is disclosed where each wind turbine includes a tower, a gearbox coupled to the tower, and a plurality of turbine blades coupled to the gearbox, and the monitoring system includes a controller, a hub node coupled to each gearbox, and a plurality of blade sensors. The condition monitoring method includes determining shadowing areas, configuring each of the plurality of blade sensors to only transmit when outside the shadowing areas, receiving blade sensor readings at the controller from a blade sensor when the blade sensor is outside the shadowing areas, and determining a position of the blade sensor based on the blade sensor readings. The direct communication path between a blade sensor and the controller is obstructed when the blade sensor is in the shadowing areas. The method can also include determining favorable communication regions, configuring each of the plurality of blade sensors to only transmit when within the favorable communication regions; and receiving blade sensor readings at the controller from a blade sensor when the blade sensor is within the favorable communication regions. The favorable communication regions are areas outside the shadowing areas where the communication path between the blade sensor and the controller is less than a separation threshold. The method can also include determining a transmission region outside the shadowing areas or within the favorable communication regions such that only one blade sensor of the plurality of blade sensors is in the transmission region at a time; configuring the blade sensors to only transmit when within the transmission region, and receiving blade sensor readings at the controller from a blade sensor when the blade sensor is within the transmission region.

A wind turbine condition monitoring method for wind turbines with a monitoring system is disclosed where each wind turbine includes a tower, a gearbox coupled to the tower, and a plurality of turbine blades coupled to the gearbox, and the monitoring system includes a controller, a hub node coupled to each gearbox, and a plurality of blade sensors. The condition monitoring method includes determining blade shadowing areas, configuring each of the plurality of blade sensors to only transmit when outside the blade shadowing areas, receiving blade sensor readings at the hub node from a blade sensor when the blade sensor is outside the blade shadowing areas; transmitting hub node signals from the hub node to the controller, and determining a position of the blade sensor based on the blade sensor readings. The hub node signals include information from the blade sensor readings. The communication path between a blade sensor and the hub node is obstructed when the blade sensor is in the blade shadowing areas. The method can also include determining hub shadowing areas, determining a position of the hub node based on the hub node signals, configuring the hub node to only transmit to the controller when outside the hub shadowing areas, and configuring the controller to only transmit to the hub node when the hub node is outside the hub shadowing areas. The communication path between the hub node and the controller is obstructed when the hub node is in the hub shadowing areas. The wind turbine condition monitoring method can also include determining a transmission region outside the blade shadowing areas such that only one blade sensor at a time is in the transmission region, configuring each blade sensor to only transmit when within the transmission region; and receiving blade sensor readings at the hub node from a blade sensor when the blade sensor is within the transmission region. The plurality of blade sensors and the hub node can include a multi-axis accelerometer.

BRIEF DESCRIPTION OF THE DRAWINGS

The above mentioned and other features and objects of this invention, and the manner of attaining them, will become more apparent and the invention itself will be better understood by reference to the following description of exemplary embodiments of the invention taken in conjunction with the accompanying drawings, wherein.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF EXEMPLARY EMBODIMENTS

There are numerous applications that use sensors mounted on wind turbines and wind turbine blades for condition monitoring, for example to detect damage or potential damage to the wind turbine and/or the blades, or to increase the energy harvesting efficiency of the wind turbine. Condition monitoring of wind turbine blades can increase the lifetime of the blades and turbine by detecting abnormalities earlier and thereby enabling the taking of preventive measures sooner to avoid or reduce damage to the blades and turbine. An exemplary type of sensor that can be used for wind turbine condition monitoring is an accelerometer which can measure acceleration of an object. An accelerometer can help in detecting lightning strikes on a wind turbine blade so that the wind turbine (also referred to as a windmill) can be stopped quickly after any lightning strike to reduce damage to the turbine and the blades. Accelerometer sensor data can also be used to detect ice deposits on the turbine blades to enable stopping of the turbine blades at an appropriate level of ice deposits and restarting the turbine blades when sufficient ice has melted.

The data from wind turbine condition monitoring sensors can be collected at a central unit or controller which may be located on the wind turbine tower or away from the wind turbine tower. The central unit can collect the sensor data and execute algorithms based on the needs of the specific application. The wind turbine sensors can be wireless and data from the sensors can be transmitted to the central unit on wireless links. Techniques can be implemented to make the wireless data transmission robust and energy efficient. Accelerometer sensors can be used to determine the position of wind turbine blades, and this position information can be used to determine transmission times when the wireless links between the sensors and the central unit are within acceptable limits and to determine scheduling for the transmissions of data from multiple sensors on different blades to the central unit or intermediate communication node.

Figure 1:
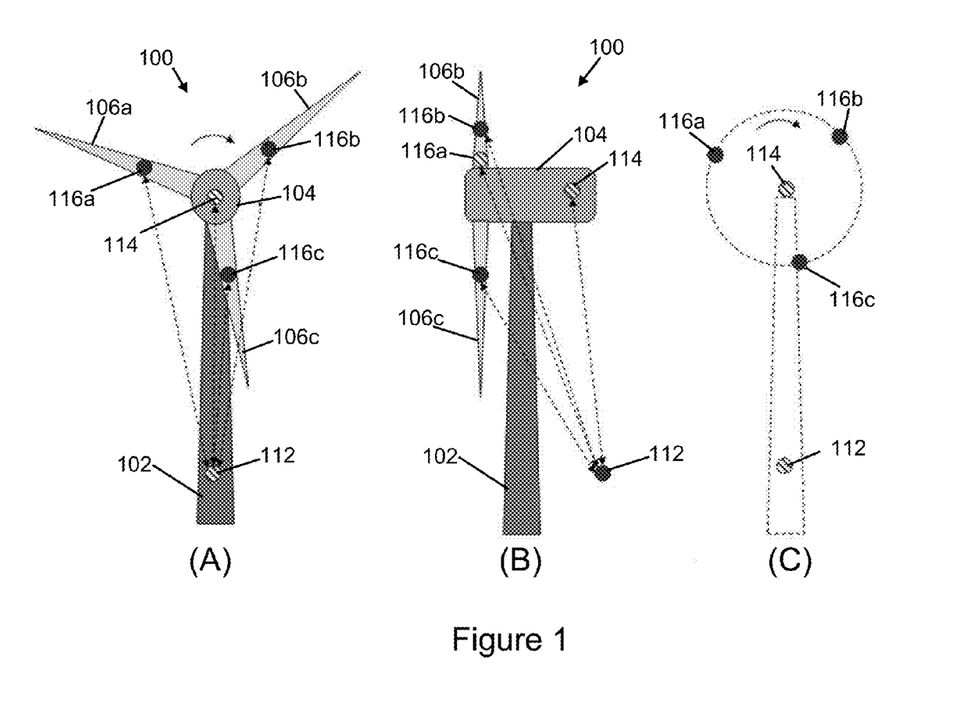
FIG. 1 illustrates an exemplary wind turbine with a single level hierarchy condition monitoring system.

FIG. 1 illustrates an exemplary wind turbine 100 with a single level hierarchy condition monitoring system. FIG. 1(A) provides a front view of the wind turbine 100, FIG. 1(B) provides a side view of the wind turbine 100, and FIG. 1(C) provides a simplified front view showing the communication nodes and an outline of the structure of the wind turbine 100. The wind turbine 100 includes a tower 102, a gearbox 104 and a plurality of wind turbine blades 106. The exemplary wind turbine 100 can include any number of two or more turbine blades 106. Three turbine blades 106a, 106b, 106c are shown for illustration in FIG. 1. The wind turbine 100 also includes a controller 112, a hub node 114 and a plurality of blade sensors 116, with at least one blade sensor 116 per blade 106. The controller 112 may or may not be located on the wind turbine 100. In this exemplary wind turbine 100, the hub node 114 is coupled to the gearbox 104, and the blade sensors 116a, 116b, 116c are coupled to the wind turbine blades 106a, 106b, 106c, respectively.

In the single level hierarchy condition monitoring system embodiment shown in FIG. 1, the controller 112 has direct bidirectional communication with the hub node 114 and each of the blade sensors 116. Various communication protocols using wired and wireless communication links can be used to link the communication nodes 112, 114, 116. An exemplary communication protocol is to use wireless communication between the controller 112, the hub node 114 and the blade sensors 116. An alternative communication protocol is to use wired communication between the controller 112 and the hub node 114, and to use wireless communication between the blade sensors 116 and the controller 112 and/or hub node 114. The controller 112 can run applications, detect and process readings from the blade sensors 116 and the hub node 114 as required by the applications, and then communicate instructions to the hub node 114 and/or blade sensors 116 to take appropriate actions such as stopping the rotor, increasing/decreasing the blade rotation speed, changing blade angles etc.

Figure 2:
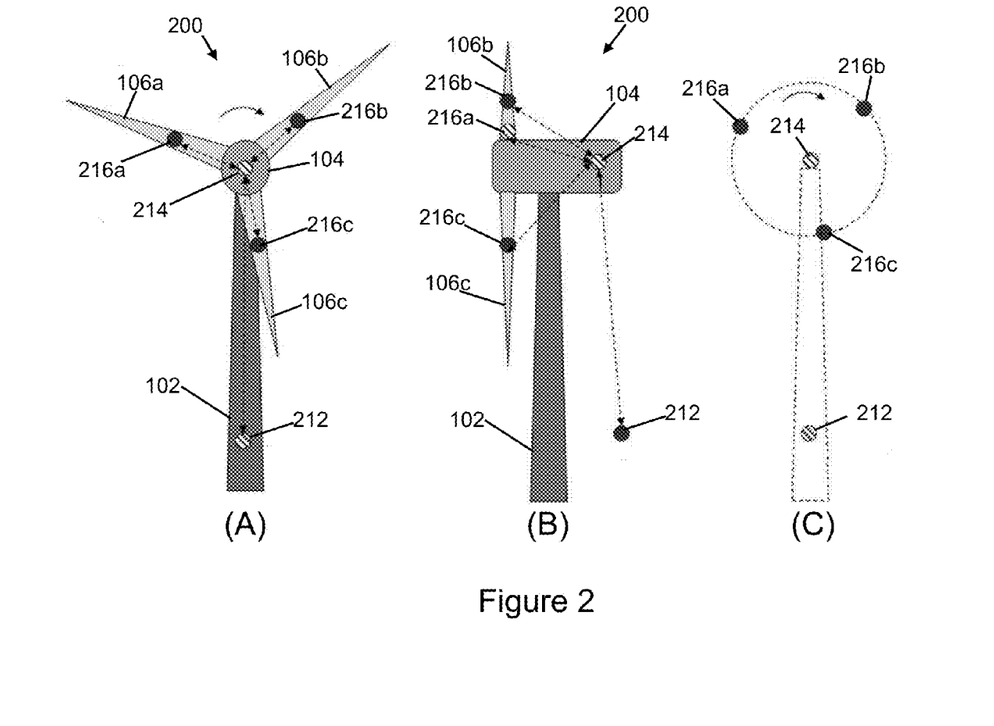
FIG. 2 illustrates an exemplary wind turbine with a two level hierarchy condition monitoring system.

FIG. 2 illustrates an alternative exemplary wind turbine 200 with a two level hierarchy condition monitoring system. FIG. 2(A) provides a front view of the wind turbine 200, FIG. 2(B) provides a side view of the wind turbine 200, and FIG. 2(C) provides a simplified front view showing the communication nodes and an outline of the structure of the wind turbine 200. The wind turbine 200 also includes a tower 102, a gearbox 104 and a plurality of wind blades 106. However, the communication nodes of the wind turbine 200 are linked differently than the communication nodes of the wind turbine 100. The wind turbine 200 includes a controller 212, a hub node 214 and a plurality of blade sensors 216, with at least one blade sensor 216 per blade 106. The controller 212 may or may not be located on the wind turbine 200. In this exemplary embodiment 200, the hub node 214 is coupled to the gearbox 104, and the blade sensors 216a, 216b, 216c are coupled to the wind turbine blades 106a, 106b, 106c, respectively.

In the two level hierarchy condition monitoring system shown in FIG. 2, the controller 212 has direct bidirectional communication with the hub node 214, and the hub node 214 has direct bidirectional communication with each of the blade sensors 216. However, the controller 212 does not have direct bidirectional communication with the blade sensors 216. Various communication protocols using wired and wireless communication links can be used to link the communication nodes 212, 214, 216. An exemplary communication protocol is to use wireless communication between the controller 212 and the hub node 214, and to use wireless communication between the hub node 214 and the blade sensors 216. An alternative communication protocol is to use wired communication between the controller 212 and the hub node 214, and to use wireless communication between the hub node 214 and the blade sensors 216. The controller 212 can run applications and the hub node 214 can receive readings from the blade sensors 216, the controller 212 can receive readings from the hub node 214 and from the blade sensors 216 through the hub node 214 as required by the applications, the controller 212 can communicate instructions to the hub node 214 to take appropriate actions, and the hub node 214 can forward instructions to the blade sensors 216 as necessary.

Figure 3:
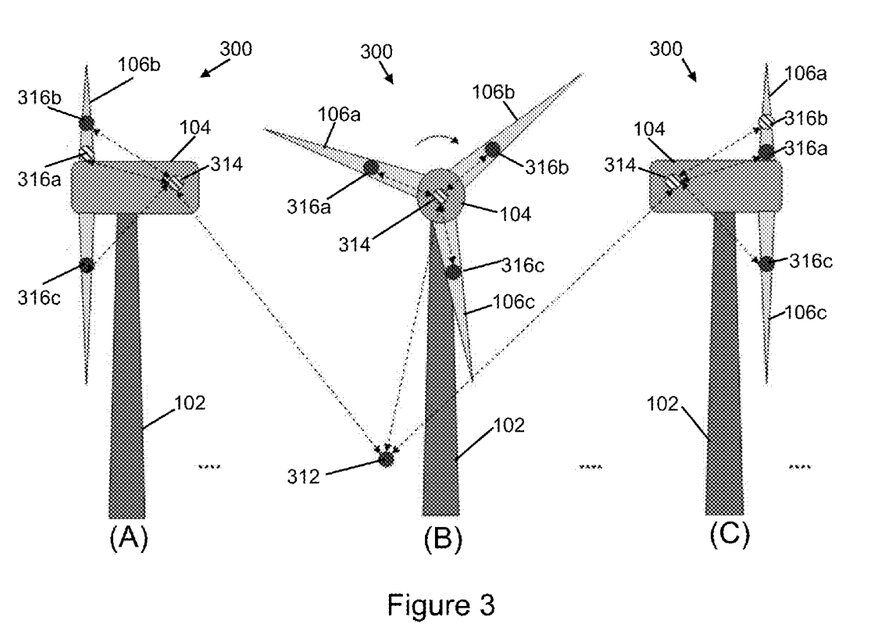
FIG. 3 illustrates an exemplary wind turbine with a two level hierarchy condition monitoring system in which a single controller is used to control multiple wind turbines.

FIG. 3 illustrates an alternative exemplary wind turbine 300 with a two level hierarchy condition monitoring system in which a single controller is used for multiple wind turbines 300. FIG. 3 shows an exemplary system with three wind turbines 300 linked to a single controller 312, but more or less than three wind turbines 300 can be linked to the controller 312. Each wind turbine 300 includes a tower 102, a gearbox 104 and a plurality of wind turbine blades 106. However, the communication nodes of the wind turbine 300 are linked differently such that a single controller 312 is used for multiple wind turbines 300. The condition monitoring system shown in FIG. 3 includes a single controller 312 linked to a plurality of wind turbines, a hub node 314 coupled to each of the wind turbines 300 of the plurality of wind turbines, and at least one blade sensor 316 coupled to each of the wind turbine blades 106 of the plurality of wind turbines. The controller 312 may or may not be located on one of the plurality of wind turbines. In this exemplary embodiment, a hub node 314 is coupled to the gearbox 104 of each of the wind turbines 300, and blade sensors 316a, 316b, 316c are coupled to the wind turbine blades 106a, 106b, 106c, respectively, of each of the wind turbines 300.

In the two level hierarchy condition monitoring system embodiment shown in FIG. 3, the controller 312 has direct bidirectional communication with the hub node 314 of each wind turbine 300 of the plurality of wind turbines, and for each wind turbine 300 the hub node 314 has direct bidirectional communication with each of the blade sensors 316 of that wind turbine 300. However, the controller 312 does not have direct bidirectional communication with the blade sensors 316. Various communication protocols using wired and wireless communication links can be used to link the communication nodes 312, 314, 316. An exemplary communication protocol is to use wireless communication between the controller 312 and each of the linked hub nodes 314, and for each of the wind turbines 300 to use wireless communication between the hub node 314 and the blade sensors 316 of that wind turbine 300. An alternative communication protocol is to use wired communication between the controller 312 and each of the linked hub nodes 314, and for each of the wind turbines 300 to use wireless communication between the hub node 314 and the blade sensors 316 of that wind turbine 300. The controller 312 can run applications and the hub nodes 314 can receive readings from the blade sensors 316, the controller 312 can receive readings from the hub nodes 314 and from the blade sensors 316 through the hub nodes 314 as required by the applications, the controller 312 can communicate instructions to the appropriate hub nodes 314 to take appropriate actions, and the hub nodes 314 can forward instructions to the blade sensors 316 as necessary.

Figure 4:
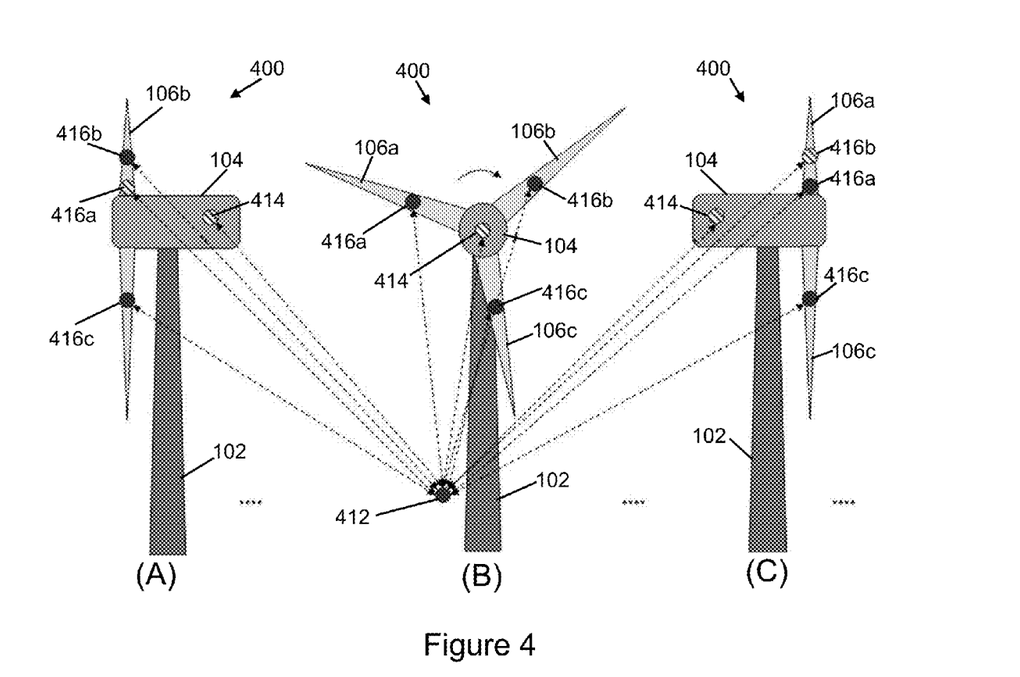
FIG. 4 illustrates an exemplary wind turbine with a single level hierarchy condition monitoring system in which a single controller is used to control multiple wind turbines.

FIG. 4 illustrates an alternative exemplary wind turbine 400 with a single level hierarchy condition monitoring system in which a single controller is used for multiple wind turbines 400. FIG. 4 shows an exemplary system with three wind turbines 400 linked to a single controller 412, but more or less than three wind turbines 400 can be linked to the controller 412. Each wind turbine 400 includes a tower 102, a gearbox 104 and a plurality of wind turbine blades 106. However, the communication nodes of the wind turbine 400 are linked differently such that a single controller 412 is used for multiple wind turbines 400. The condition monitoring system shown in FIG. 4 includes a single controller 412 linked to the plurality of hub nodes 414 and blade sensors 416 of the plurality of wind turbines 400. The controller 412 may or may not be located on one of the wind turbines 400. In this exemplary embodiment 400, a hub node 414 is coupled to the gearbox 104 of each of the wind turbines 400, and blade sensors 416a, 416b, 416c are coupled to the wind turbine blades 106a, 106b, 106c, respectively, of each of the wind turbines 400.

In the single level hierarchy condition monitoring system embodiment shown in FIG. 4, the controller 412 has direct bidirectional communication with the hub nodes 414 and the blade sensors 416 of each of the wind turbines 400 of the plurality of wind turbines. Various communication protocols using wired and wireless communication links can be used to link the communication nodes 412, 414, 416. An exemplary communication protocol is to use wireless communication between the controller 412 and each of the linked hub nodes 414 and turbine blade sensors 416 of the plurality of wind turbines. An alternative communication protocol is to use wired communication between the controller 412 and the linked hub nodes 414 of the plurality of wind turbines, and to use wireless communication between the controller 412 and the linked blade sensors 416 of the plurality of wind turbines. The controller 412 can run applications, detect and process readings from the blade sensors 416 and the hub nodes 414 as required by the applications, and the controller 412 can communicate instructions to the hub nodes 414 and/or blade sensors 416 to take appropriate actions such as stopping the rotor, increasing/decreasing the blade rotation speed, changing blade angles, etc.

A multi-axis accelerometer sensor can be used in a condition monitoring system for robust wireless communication. A multi-axis accelerometer sensor can sense vibrations and movement in the wind turbine blades and other components of the wind turbine. A multi-axis accelerometer sensor can be used to sense orientation and acceleration of a wind turbine blade which can be used to identify the current and future position of the blade or gearbox. This position information can be used for various applications, for example position information can be used to avoid shadowing, to select desired communication positions, to develop communication scheduling algorithms and/or to develop power efficient communication algorithms.

Figure 5:
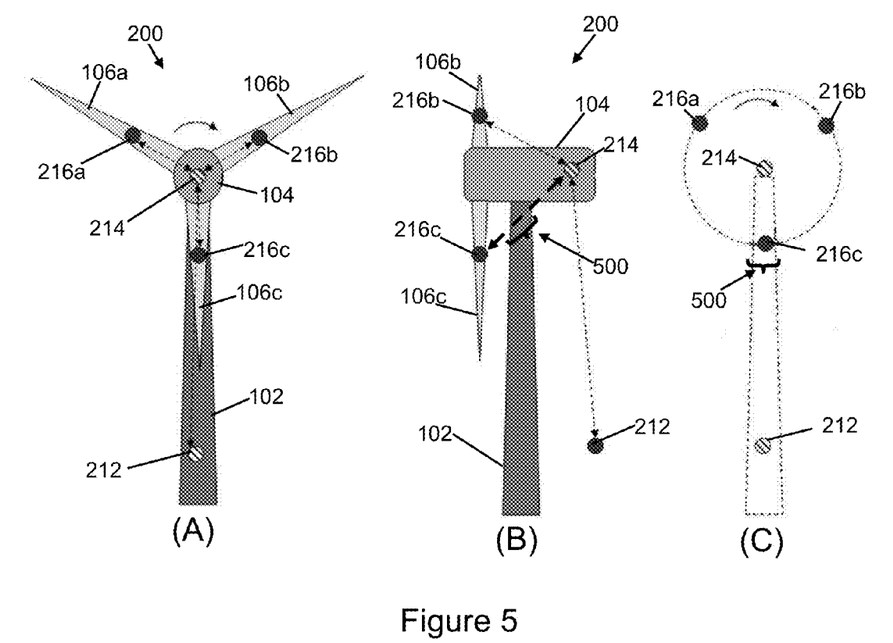
FIG. 5 illustrates an exemplary shadowing scenario between blade sensors and a hub node for a wind turbine with a two level hierarchy condition monitoring system.
Figure 6:
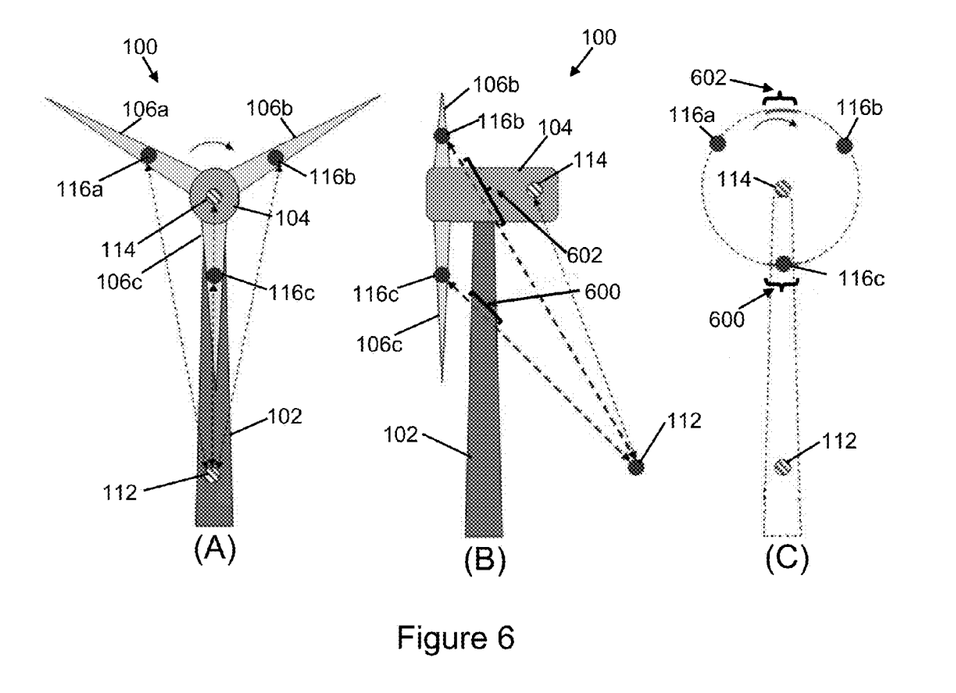
FIG. 6 illustrates exemplary shadowing scenarios between blade sensors and a hub node and between blade sensors and a controller for a wind turbine with a single level hierarchy condition monitoring system.
Figure 7:
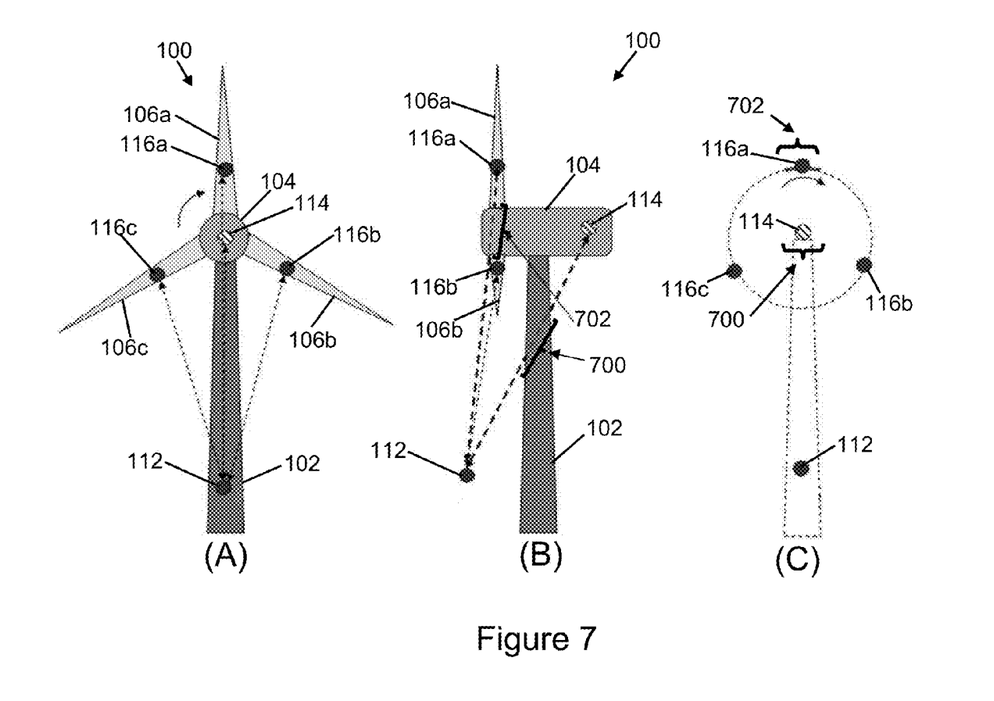
FIG. 7 illustrates exemplary shadowing scenarios between blade sensors and a controller and between a hub node and a controller for a wind turbine with a single level hierarchy condition monitoring system.

Shadowing occurs when obstacles obstruct the direct wireless communication path between a pair of nodes. Position information can be provided by a multi-axis accelerometer sensor to avoid shadowing effects on communication. Depending on the positions of the tower 102, the gearbox 104 and the blades 106 and the network architecture, several scenarios are possible where a direct communication path between a pair of nodes can be obstructed and thereby be affected by shadowing. Some exemplary shadowing scenarios are illustrated in FIGS. 5, 6 and 7. Many other shadowing scenarios are possible, and are different depending on the locations of the communication nodes. Position information can be used to determine blade and gearbox positions that are affected by shadowing for direct communication, such as the exemplary positions shown in FIGS. 5, 6 and 7, and these positions can be avoided when developing communication schedules.

FIG. 5 illustrates an exemplary shadowing scenario for a two level hierarchy condition monitoring system using the exemplary wind turbine 200 of FIG. 2. FIG. 5(A) illustrates a front view of the shadowing scenario, FIG. 5(B) illustrates a side view of the shadowing scenario, and FIG. 5(C) illustrates a simplified front view of the shadowing scenario which shows the communication nodes and an outline of the structure of the wind turbine 200. As described above for the exemplary wind turbine 200, the controller 212 has direct bidirectional communication with the hub node 214, and the hub node 214 has direct bidirectional communication with each of the blade sensors 216. In the shadowing scenario illustrated in FIG. 5, the wind turbine blades 106a, 106b, 106c rotate about an axis passing through the gearbox 104, and during a rotation each of the turbine blades 106 will pass in front of the tower 102 such that the tower 102 obstructs the direct wireless communication path between the hub node 214 and the sensor 216 of the turbine blade 106 passing in front of the tower 102. FIG. 5 specifically shows the scenario when the turbine blade 106c passes in front of the tower 102 such that the tower 102 obstructs the direct wireless communication path between the hub node 214 and the sensor 216c of the turbine blade 106c. A shadowing area 500 is shown in FIGS. 5(B) and 5(C). Note that this area occurs for each of the turbine blade sensors 216a, 216b, 216c as its respective turbine blade 106a, 106b, 106c passes in front of the tower 102 during a rotation.

FIG. 6 illustrates exemplary shadowing scenarios for a single level hierarchy condition monitoring system using the exemplary wind turbine 100 of FIG. 1. FIG. 6(A) illustrates a front view of the shadowing scenarios, FIG. 6(B) illustrates a side view of the shadowing scenarios, and FIG. 6(C) illustrates a simplified front view of the shadowing scenarios which shows the communication nodes and an outline of the structure of the wind turbine 100. As described above for the exemplary wind turbine 100, the controller 112 has direct bidirectional communication with the hub node 114 and each of the blade sensors 116. In the shadowing scenario illustrated in FIG. 6, the controller node 112 is behind the wind turbine 100, meaning on the opposite side of the tower 102 as the blades 106. In this exemplary embodiment, as the wind turbine blades 106a, 106b, 106c rotate about an axis passing through the gearbox 104, each of the turbine blades 106 will pass through two shadowing areas. A first shadowing area 600 occurs when a turbine blade 106 passes in front of the tower 102 such that the tower 102 obstructs the direct wireless communication path between the controller 112 and the sensor 116 of the turbine blade 106 passing in front of the tower 102. A second shadowing area 602 occurs around the top of rotation where a sensor 116 of a turbine blade 106 near the top of rotation passes above the gearbox 104 such that the gearbox 104 obstructs the direct wireless communication path between the controller 112 and the sensor 116. FIG. 6(B) illustrates the scenarios when the turbine blade 106c passes in front of the tower 102 such that the tower 102 obstructs the direct wireless communication path between the controller 112 and the sensor 116c of the turbine blade 106c (first shadowing area 600); and when the sensor 116b of the turbine blade 106b near the top of rotation passes above the gearbox 104 such that the gearbox 104 obstructs the direct wireless communication path between the controller 112 and the sensor 116b (second shadowing area 602). Shadowing areas 600 and 602 are shown in FIGS. 6(B) and 6(C). Note that these shadowing areas occur for each of the turbine blade sensors 116a, 116b, 116c as its respective turbine blade 106a, 106b, 106c passes through the shadowing areas 600 and 602 during a rotation.

FIG. 7 illustrates an exemplary shadowing scenario for a single level hierarchy condition monitoring system using the exemplary wind turbine 100 of FIG. 1. FIG. 7(A) illustrates a front view of the shadowing scenario, FIG. 7(B) illustrates a side view of the shadowing scenario, and FIG. 7(C) illustrates a simplified front view of the shadowing scenario which shows the communication nodes and an outline of the structure of the wind turbine 100. As described above for the exemplary wind turbine 100, the controller 112 has direct bidirectional communication with the hub node 114 and each of the blade sensors 116. In the shadowing scenarios illustrated in FIG. 7, the controller node 112 is in front of the wind turbine 100, meaning on the same side of the tower 102 as the blades 106. A first shadowing area 700 affecting the hub node 114 to controller 112 communication path occurs as the wind turbine gearbox 104 oscillates on the tower 102. As the hub node 114 coupled to the gearbox 104 passes behind the tower 102 through the first shadowing area 700, the tower 102 obstructs the direct wireless communication path between the controller 112 and the hub node 114. A second shadowing area 702 occurs as the wind turbine blades 106a, 106b, 106c rotate about an axis passing through the gearbox 104, and each of the blades 106 passes through the second shadowing area 702 near the top of rotation where the front of the gearbox 104 (the portion of the gearbox 104 on the opposite side of the blades 106 as the tower 102) obstructs the direct wireless communication path between the turbine blade 106 and the controller 112. Note that these shadowing areas 700, 702 will be affected by various factors, for example where the controller 112 is located relative to the tower 102, where the hub node 114 is coupled to the gearbox 104, where the sensors 116 are located on the blades 106 and how far the front of the gearbox 104 extends in front of the blades 106. FIG. 7 specifically shows the scenario where the hub node 114 is attached to the gearbox 104 behind the tower 102 and the controller 112 is located in front of the tower 102 such that the tower 102 obstructs the direct wireless communication path between the controller 112 and the hub node 114 causing the first shadowing area 700; and where the blade sensor 116a coupled to the turbine blade 106a is around the peak of rotation such that the front of the gearbox 104 obstructs the direct wireless communication path between the controller 112 and the blade sensor 116a causing the second shadowing area 702. The shadowing areas 700, 702 are indicated in FIGS. 7(B) and 7(C). The first shadowing area 700 is also applicable to a two level hierarchy condition monitoring system since it affects the communication path between the controller 112, 212 and the hub node 114, 214. The hub node 114 can include a multi-axis accelerometer or other capable sensor that can be used to provide position information for the hub node 114.

Figure 8:
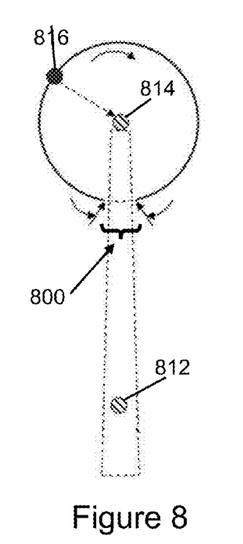
FIG. 8 illustrates favorable blade locations for communication between blade sensors and a hub node coupled to a gearbox.
Figure 9:
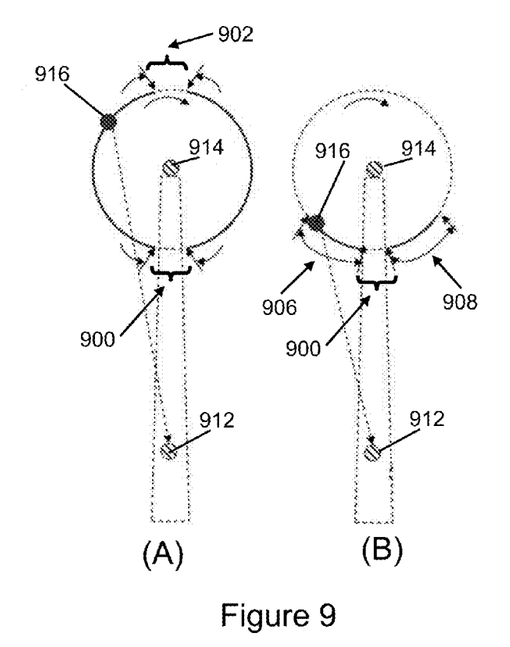
FIG. 9 illustrates favorable blade locations for communication between blade sensors and a controller node.

Position information, such as the information that can be provided by a multi-axis accelerometer sensor, can also be used for determination of desired communication positions. Again depending on the network architecture, there will be some controller, gearbox and blade locations more suitable for communication. Various factors can select the desired communication positions including shadowing. Wireless communication quality decreases as the distance between communication nodes increases. This can also be used to make communication more energy efficient, for example higher data rates can be achieved at closer distances which can reduce power consumption for transmission. The number of desired communication positions, for example size of the blade arc for desired communications, may depend on communication range constraints. FIGS. 8 and 9 indicate favorable positions for blade sensors for communication with a hub node and a controller.

FIG. 8 illustrates favorable blade locations for communication between blade sensors 816 and a hub node 814 coupled to a gearbox. For clarity FIG. 8 only shows one blade sensor 816 but it should be understood that there would be a plurality of blade sensors 816 coupled to a plurality of blades rotating around the wind turbine gearbox. The distance between the blade sensor nodes 816 and the hub node 814 is substantially equal as the blades rotate around the gearbox. Thus, the desired communication positions for a blade sensor 816 for communication with the hub node 814 are unaffected by rotation position except for the shadowing area 800.

FIG. 9 illustrates favorable blade locations for communication between blade sensors 916 and a controller node 912. For clarity FIGS. 9(A) and 9(B) only show one blade sensor 916 but it should be understood that there would be a plurality of blade sensors 916 coupled to a plurality of blades rotating around the wind turbine gearbox. In FIG. 9(A) only shadowing is taken into account to determine desired communication positions. In a first shadowing area 900, the tower obstructs the direct communication path between the blade sensor 916 and the controller 912. In a second shadowing area 902, the gearbox obstructs the direct communication path between the blade sensor 916 and the controller 912. Obviously the extent of the obstruction will depend on the relative locations of the blade sensors, the controller, the tower and the gearbox. In FIG. 9(B) both shadowing and communication distance are taken into account to determine desired communication positions. Since the controller 912 is located below the blade sensors 916, the blade sensor positions near the bottom of rotation in areas 906 and 908 where the blade sensors 916 are nearer to the controller 912 but not obstructed by the tower shadowing area 900 will be better for wireless communication since the communication path distance is shorter. The closer distance may provide better communication reliability and efficiency.

Figure 10:
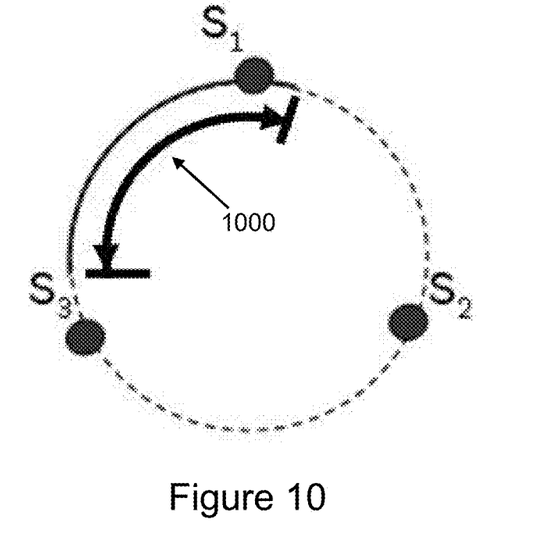
FIG. 10 illustrates an exemplary scenario where a blade sensor can transmit during any part of a favorable communication region without interfering with other blade sensors.

Once favorable communication locations have been identified, the next step is to develop communication schedules so that each of the sensor nodes can communicate with the controller and/or hub node reliably without interfering with the communications of other sensor nodes. Ideally, a sensor node can start transmitting when its blade enters the favorable communication region and can continue to communicate while its blade remains within the favorable communication region. This is possible when the favorable communication region is less than 1/n of the total locations, where 'n' is the total number of blades. In that case no two blades (or sensors) will be in the favorable communication region simultaneously and the transmission region is equal to the favorable communication region. FIG. 10 shows such a scenario where the favorable communication region 1000 is less than one-third of total blade locations and there are three or fewer blades. In this scenario, the transmission region can be the entire favorable communication region 1000 for each blade sensor.

Figure 11:
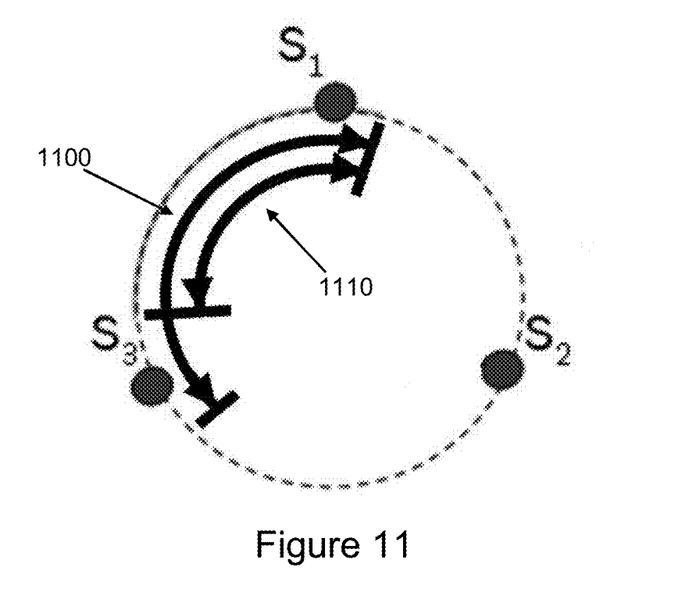
FIG. 11 illustrates an exemplary scenario where a blade sensor can transmit only during a portion of a favorable communication region without interfering with other blade sensors.

FIG. 11 shows the scenario where the favorable communication region 1100 is greater than or equal to one-third of total blade locations and there are three blades. In this scenario, before one blade completely leaves the favorable communication region 1100 the next blade enters the favorable communication region 1100. Thus, as shown in FIG. 11, blade sensors $S_1$ and $S_3$ might transmit simultaneously and thereby interfere with each others communication. A communication scheduling algorithm can be implemented to ensure that sensors transmit only during a subset of the favorable communication region, such as a transmission region 1110. The transmission region 1110 is a reduced region such that it is less than one-third of the overall sensor locations and only one sensor is in the transmission region 1110 at a time.

The position information can also be used to develop power efficient transmission procedures. The transmission power required to achieve a desired reliability is directly proportional to the distance of separation between the transmitting and receiving devices. Therefore, of all the available favorable communication locations, the locations that have less separation distance between the transmitter and receiver can be selected for improved power efficiency. Examples of this are the regions 906 and 908 of FIG. 9(B). A separation threshold can be established that enables the necessary communication between the nodes to take place but also reduces the separation distance between the communicating nodes to reduce the power requirements for the communication. This can save energy by transmitting at less power and still provide the desired reliability. Saving energy can be important, especially when wireless devices are battery powered. Hence, knowing blade location also enables factoring power efficiency into communication scheduling.

While this invention has been described as having an exemplary design, the present invention may be further modified within the spirit and scope of this disclosure. This application is therefore intended to cover any variations, uses, or adaptations of the invention using its general principles.

We claim:

1. A wind turbine condition monitoring system for at least one wind turbine, each of the at least one wind turbine comprising a tower, a gearbox supported by the tower and a plurality of turbine blades coupled to the gearbox, the condition monitoring system comprising:
   a plurality of blade sensors configured to provide blade sensor readings associated with an associated one of the plurality of turbine blades, each of the plurality of blade sensors coupled to the associated one of the plurality of turbine blades;
   at least one hub node, each of the at least one hub nodes supported by the gearbox of a respective one of the at least one wind turbine; and
   a controller in communication with the at least one hub node and the plurality of blade sensors;
   wherein the controller determines the position of each turbine blade of the plurality of turbine blades based on the blade sensor readings.

2. The wind turbine condition monitoring system of claim 1, wherein each of the plurality of blade sensors is a multi-axis accelerometer.

3. The wind turbine condition monitoring system of claim 1, wherein the controller has direct wireless communication with the at least one hub node and with each of the plurality of blade sensors.

4. The wind turbine condition monitoring system of claim 3, wherein the controller only communicates with a particular blade sensor of the plurality of blade sensors when the particular blade sensor is outside blade shadowing areas, direct wireless communication between the controller and the particular blade sensor being obstructed when the particular blade sensor is in the blade shadowing areas.

5. The wind turbine condition monitoring system of claim 4, wherein the controller only communicates with a particular hub node of the at least one hub node when the particular hub node is outside hub node shadowing areas, direct wireless communication between the controller and the particular hub node being obstructed when the particular hub node is in the hub node shadowing areas.

6. The wind turbine condition monitoring system of claim 1, wherein:
   the controller has direct wireless communication with the at least one hub node;
   each of the at least one hub nodes has direct wireless communication with each of the plurality of blade sensors of the respective one of the at least one wind turbine; and
   the controller is in communication with the plurality of blade sensors through the at least one hub node.

7. The wind turbine condition monitoring system of claim 6, wherein each of the at least one hub nodes only communicates with a particular blade sensor of the plurality of blade sensors when the particular blade sensor is not in blade shadowing areas, direct wireless communication between the at least one hub node and the particular blade sensor being obstructed when the particular blade sensor is in the blade shadowing areas.

8. The wind turbine condition monitoring system of claim 7, wherein the controller only communicates with a communicating hub node of the at least one hub node when the communicating hub node is outside hub node shadowing areas, direct wireless communication between the controller and the communicating hub node being obstructed when the communicating hub node is in the hub node shadowing areas.

9. The wind turbine condition monitoring system of claim 1, wherein the controller only communicates with a particular blade sensor of the plurality of blade sensors when the particular blade sensor is in a favorable communication region, the controller determining whether the particular blade sensor is in the favorable communication region based on the blade sensor readings; the favorable communication region having an unobstructed communication path between the controller and the particular blade sensor.

10. The wind turbine condition monitoring system of claim 9, wherein the favorable communication region is further constrained such that a separation distance between the controller and the particular blade sensor is less than a separation distance threshold when the particular blade sensor is in the favorable communication region.

11. The wind turbine condition monitoring system of claim 10, wherein the favorable communication region is further constrained such that only one blade sensor of the plurality of blade sensors is in the favorable communication region at a time.

12. The wind turbine condition monitoring system of claim 9, wherein the favorable communication region is further constrained such that only one blade sensor of the plurality of blade sensors is in the favorable communication region at a time.

13. A wind turbine condition monitoring method for wind turbines with a monitoring system, each wind turbine comprising a tower, a gearbox coupled to the tower, and a plurality of turbine blades coupled to the gearbox, and the monitoring system comprising a controller, a hub node coupled to each gearbox, and a plurality of blade sensors, the condition monitoring method comprising:
   determining for each one of the plurality of blade sensors respective shadowing areas where a communication path between the one of the plurality of blade sensors and the controller is obstructed when the one of the plurality of blade sensors is in the respective shadowing areas; each one of the plurality of blade sensors coupled to a respective one of the plurality of turbine blades;

configuring each one of the plurality of blade sensors to only transmit when outside the respective shadowing areas;

receiving blade sensor readings at the controller from each one of the plurality of blade sensors when each one of the plurality of blade sensors is outside the respective shadowing areas; and determining a position of each one of the plurality of blade sensors based on the blade sensor readings.

14. The wind turbine condition monitoring method of claim 13, further comprising:

determining respective favorable communication regions outside the respective shadowing areas where the communication path between each one of the plurality of blade sensors and the controller is less than a separation distance threshold;

configuring each one of the plurality of blade sensors to only transmit when within the respective favorable communication regions; and receiving blade sensor readings at the controller from each one of the plurality of blade sensors when each one of the plurality of blade sensors is within the respective favorable communication regions.

15. The wind turbine condition monitoring method of claim 13, further comprising:

determining a respective transmission region outside the respective shadowing areas such that only one blade sensor of the plurality of blade sensors is in the respective transmission region at a time;

configuring each one of the plurality of blade sensors to only transmit when within the respective transmission region; and receiving blade sensor readings at the controller from each one of the plurality of blade sensors when each one of the plurality of blade sensors is within the respective transmission region.

16. The wind turbine condition monitoring method of claim 13, wherein each of the plurality of blade sensors includes a multi-axis accelerometer.

17. The wind turbine condition monitoring method of claim 14, further comprising:

determining a respective transmission region within the respective favorable communication regions such that only one blade sensor of the plurality of blade sensors is in the respective transmission region at a time;

configuring each one of the plurality of blade sensors to only transmit when within the transmission region; and receiving blade sensor readings at the controller from each one of the plurality of blade sensors when each one of the plurality of blade sensors is within the transmission region.

18. A wind turbine condition monitoring method for monitoring at least one wind turbine with a monitoring system, each of the at least one wind turbines comprising a tower, a gearbox supported by the tower, and a plurality of turbine blades supported by the gearbox, and the monitoring system comprising (i) a controller, (ii) at least one hub node, each of the at least one hub nodes supported by the gearbox of a respective one of the at least one wind turbine, and (iii) a plurality of blade sensors, each one of the plurality of blade sensors coupled to a respective one of the plurality of turbine blades and associated with an associated hub node of the at least one hub node, the condition monitoring method comprising:

transmitting blade sensor readings from each one of the plurality of blade sensors only when the one of the plurality of blade sensors is outside blade shadowing areas in which a communication path is obstructed between the one of the plurality of blade sensors and the associated hub node;

receiving the blade sensor readings at the associated hub node from the one of the plurality of blade sensors when the one of the plurality of blade sensors is outside the blade shadowing areas;

transmitting hub node signals from the associated hub node to the controller, the hub node signals including information from the blade sensor readings; and determining, with the controller, a position of the one of the plurality of blade sensors based on the blade sensor readings.

19. The wind turbine condition monitoring method of claim 18, wherein each of the plurality of blade sensors and each one of the at least one hub node includes a multi-axis accelerometer.

20. The wind turbine condition monitoring method of claim 18, further comprising:

determining a position of the associated hub node based on the hub node signals;

transmitting from the associated hub node to the controller only when the associated hub node is outside hub shadowing areas in which a communication path between the associated hub node and the controller is obstructed; and transmitting from the controller to the associated hub node only when the associated hub node is outside the hub shadowing areas.

21. The wind turbine condition monitoring method of claim 20, further comprising:

transmitting the blade sensor readings from each one of the plurality of blade sensors only when the one of the plurality of blade sensors is within a transmission region of the respective one of the at least one wind turbines, the transmission region defined as a region in which no more than one of the plurality of blade sensors is located at any given time; and receiving the blade sensor readings at the associated hub node from the one of the blade sensors when the one of the blade sensors is within the transmission region.

* * * * *